(12) United States Patent
Heuser

(10) Patent No.: US 11,248,589 B2
(45) Date of Patent: Feb. 15, 2022

(54) WIND TURBINE MAIN ROTOR ARRANGEMENT WITH INTEGRATED LUBRICATION FACILITY

(71) Applicant: Vestas Wind Systems A/S, Aarhus N. (DK)

(72) Inventor: Lutz Heuser, Velbert (DE)

(73) Assignee: Vestas Wind Systems A/S, Aarhus N. (DK)

( * ) Notice: Subject to any disclaimer, the term of this patent is extended or adjusted under 35 U.S.C. 154(b) by 45 days.

(21) Appl. No.: 16/477,278

(22) PCT Filed: Feb. 2, 2018

(86) PCT No.: PCT/DK2018/050022
§ 371 (c)(1),
(2) Date: Jul. 11, 2019

(87) PCT Pub. No.: WO2018/153417
PCT Pub. Date: Aug. 30, 2018

(65) Prior Publication Data
US 2019/0390658 A1 Dec. 26, 2019

(30) Foreign Application Priority Data

Feb. 21, 2017 (DK) .......................... PA 2017 70124

(51) Int. Cl.
*F03D 80/70* (2016.01)
(52) U.S. Cl.
CPC .................... *F03D 80/70* (2016.05)
(58) Field of Classification Search
CPC ............................ F03D 80/70; F16C 33/6659
See application file for complete search history.

(56) References Cited

U.S. PATENT DOCUMENTS 3,361,497 A    1/1968 Stengel
4,043,620 A *  8/1977 Otto ...................... F16C 33/726
                                              384/485

(Continued)

FOREIGN PATENT DOCUMENTS

CN    103208888 A    7/2013
DE    102014222790 A1    5/2016

(Continued)

OTHER PUBLICATIONS

European Patent Office, International Search Report and Written Opinion in PCT Application No. PCT/DK2018/050022, dated Apr. 30, 2018.

(Continued)

*Primary Examiner* — Richard A Edgar
(74) *Attorney, Agent, or Firm* — Wood Herron & Evans LLP

(57) ABSTRACT

A main rotor arrangement for a wind turbine, comprising a shaft which is rotatable within a shaft housing about a rotational axis, a bearing including an inner ring, an outer ring, and a plurality of rolling elements, wherein the bearing is located between the shaft and the housing thereby to enable the shaft to rotate within the shaft housing. The shaft housing includes a first lubrication passage for carrying lubricating fluid through the shaft housing, wherein the outer ring of the bearing includes a second lubricating passage to direct lubricating fluid from the first lubricating passage in the direction of the plurality of rolling elements. The invention provides a space efficient arrangement which avoids the need to fluid delivery nozzles arranged externally to the bearing to direct fluid at the rolling elements, as in the prior art. The arrangement also means that lubrication fluid is delivered right to where it is needed in a more efficient way than in the prior art.

19 Claims, 8 Drawing Sheets

(56) References Cited

U.S. PATENT DOCUMENTS

| | | | |
|---|---|---|---|
| 8,827,561 B2* | 9/2014 | Lagerweij | F16C 19/54 384/126 |
| 10,001,170 B2* | 6/2018 | Yoshino | F16C 33/6659 |
| 2010/0009799 A1 | 1/2010 | Ciszak et al. | |
| 2012/0121420 A1* | 5/2012 | Yuki | F16C 33/64 416/174 |
| 2012/0141270 A1 | 6/2012 | Minadeo et al. | |
| 2015/0159631 A1* | 6/2015 | Bitsch | F03D 80/70 416/174 |
| 2015/0330452 A1* | 11/2015 | Mongeau | F16C 33/78 290/55 |

FOREIGN PATENT DOCUMENTS

| | | | | |
|---|---|---|---|---|
| EP | 2233760 A1 | 9/2010 | | |
| EP | 3018375 A1 | 5/2016 | | |
| GB | 195392 A | * 4/1924 | ......... | F16C 33/6677 |
| JP | 2003232366 A | 8/2003 | | |
| JP | 2008032090 A | 2/2008 | | |
| WO | 20060099014 A1 | 9/2006 | | |
| WO | 2012038327 A1 | 3/2012 | | |
| WO | 2012079911 A1 | 6/2012 | | |

OTHER PUBLICATIONS

Danish Patent and Trademark Office Search and Examination Report in PA 2017 70124, dated Aug. 15, 2017.
European Patent Office, Examination Report in EP Application No. 18704394.8, dated Jul. 13, 2020.

* cited by examiner

WIND TURBINE MAIN ROTOR ARRANGEMENT WITH INTEGRATED LUBRICATION FACILITY

TECHNICAL FIELD

The invention relates to a main rotor shaft for a wind turbine, and in particular an arrangement for a main bearing for use with that shaft.

BACKGROUND

Although many different types of wind energy generators exist today, the most common type is the horizontal axis wind turbine or "HAWT". HAWTs, hereinafter simply 'wind turbines', are in widespread use in on-shore and off-shore settings.

In order to capitalise on economies of scale, there has been a general trend for wind turbines to be designed with ever larger rotor disc diameters in an effort to increase the energy capture potential, thereby lowering the average cost of energy production. This principle has contributed to year-on-year increases in global installed capacity in an effort to re-balance the energy generation mix away from non-renewables such as oil and gas, towards renewables such as wind and solar.

However, the upward trend of wind turbine size comes with its challenges since the wind turbine towers must be taller, the blades must be longer and stronger, and the nacelles must be larger and heavier. The centrepiece of the wind turbine can be considered to be the main rotor shaft, since it carries the hub and rotor blades and harnesses the rotational energy generated by the blades so that it can be converted to electrical energy by the generator. The main rotor shaft and, thus, the housing within which it supported, therefore must be incredibly robust to withstand the huge forces generated during energy production. What's more, the main rotor shaft is typically designed with a life comparable to the rated lifetime of the wind turbine itself, which is usually in the region of 20 years.

In one arrangement, the main rotor shaft extends through a main shaft or 'bearing' housing and is rotatably supported within that housing by two main shaft bearings: a forward bearing supports the end of the shaft near to the hub, that is the 'front' or 'forward' end, and a rear bearing support the end of the shaft distal from the hub, that is the 'back' or 'rear' end. The bearings function to ensure that the main rotor shaft can rotate smoothly and also transfer axial loads and bending moments to a bed-plate or base-frame via the main bearing housing. This arrangement is generally effective at decoupling the gearbox of the wind turbine from the axial and bending forces of the main rotor shaft, so that only torque is transferred to the gearbox.

The trend towards heavier blades and hubs means that the main rotor shaft and, therefore, the supporting bearings, are required to deal with higher loads, and so there is constant pressure to design the rotor shaft assemblies to handle the loads more effectively. It is against this background that the invention has been devised.

SUMMARY OF THE INVENTION

Accordingly, the invention provides a main rotor arrangement for a wind turbine, comprising a shaft which is rotatable within a shaft housing about a rotational axis, a bearing including an inner ring, an outer ring, and a plurality of rollers, wherein the bearing is located between the shaft and the housing thereby to enable the shaft to rotate within the shaft housing. The shaft housing includes a first lubrication passage for carrying lubricating fluid through the shaft housing, wherein the outer ring of the bearing includes a second lubricating passage to direct lubricating fluid from the first lubricating passage in the direction of the plurality of rollers.

The main rotor arrangement of the invention is to be considered in the context of a utility-scale wind turbine, which would typically have a power rating of at least 1 MW. The invention therefore extends to such a wind turbine comprising a main rotor arrangement in accordance with the invention.

A benefit of the invention is that lubrication passages are formed through the main shaft housing, which is sometimes referred to as a main bearing housing, and the outer bearing ring which delivers lubricating fluid directly to the bearing rollers. This is a space efficient arrangement which avoids the need to fluid delivery nozzles arranged externally to the bearing to direct fluid at the rollers, as in the prior art. The arrangement also means that lubrication fluid is delivered right to where it is needed in a more efficient way than in the prior art.

In some embodiments, the first and second lubrication channels may be aligned. However, in some embodiments, they may not be aligned and so there may be more second lubrication passages in the outer bearing ring, compared to the number of first lubrication passages provided in the shaft housing. In such cases, a circumferential collector channel may be provided on the outer bearing ring which acts to collect lubrication fluid from the first lubricating passage from where it then flows to the one or more second lubrication passages. In effect, therefore, the channel acts as a manifold between the first and second lubrication passages. In general, however, it should be noted that there may be one or more first lubrication passages defined by the shaft housing and one or more second lubrication passages defined by the outer bearing ring. References to a lubrication passage in the singular therefore should be interpreted accordingly to encompass at least one such passage.

The lubrication passages may be angled in order to direct lubricating fluid to the required locations. For example, the second lubrication passages may be configured so that it extends through the outer ring at an inclined angle relative to a plane that is normal to the rotational axis of the shaft.

Where the first and second lubrication passages are in substantial alignment, optionally an elongate locking element may be provided which extends through the first lubrication passage and the second lubrication passage. The locking element therefore prevents or 'locks' rotational creep of the outer bearing ring relative to the shaft housing.

The locking element may take different forms. In one embodiment the locking element may have an open cross section like a cruciform shape so that fluid case flow between it and the lubrication passages. Alternatively, the locking element can be shaped like a tube so that it carries the lubrication fluid itself.

The locking element may include an outer end which is configured to lie flush, or sub-flush, to the raceway of the outer bearing ring. This means that the lubrication may be delivered to the roller surfaces of the rollers (or to the ball surfaces). However, the lubrication passages may be configured so that they emerge at a point on the raceway beyond the rollers or balls. In such a case, the locking element may be configured to protrude from the second lubrication passage and, in this way, it may optionally be formed into a nozzle to direct lubrication fluid to a selected point on the rollers/balls.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

Embodiments of the invention will now be described, by way of example only, with reference to the accompanying drawings, in which.

DETAILED DESCRIPTION

The present invention relates to an improved arrangement for a main bearing and main rotor shaft of a wind turbine. The arrangement includes lubrication passageways defined by the bearing and an outer housing of the shaft arrangement which are configured to deliver a lubrication medium in liquid form, for example and preferably oil, or even in solid form, such as graphite, directly to the contact surfaces of the bearing. Such an arrangement is able to deliver a lubrication medium in an efficient way compared to known arrangements. A further benefit is that the lubrication passages may be configured to contain a locking element which prevents the bearing outer ring, or cone, from moving or 'creeping' with respect to the outer housing. Usefully, this approach integrates two functions into a space-effective packaging arrangement. Within the scope of the present invention is also a main bearing arrangement comprising several single row main bearings.

Even though focus in the figures and in the description here is on specific set-up/type of bearings, also within the scope of the invention is a single row bearing or any arrangement of single row bearings (like a set of single row Taper roller Bearings, or a typical locating/floating arrangement existing of Cylindrical Roller Bearings, Spherical roller bearings, ball bearings or combinations of former mentioned bearing types) including an inner ring, an outer ring and a plurality of rollers or balls (roller- or ball set) and a cage/retainer, wherein the bearing or the bearing set is located between the shaft and the housing thereby to enable the shaft to rotate within the housing. It is further believed that the present invention may be used as well with sliding bearings.

Figure 4:
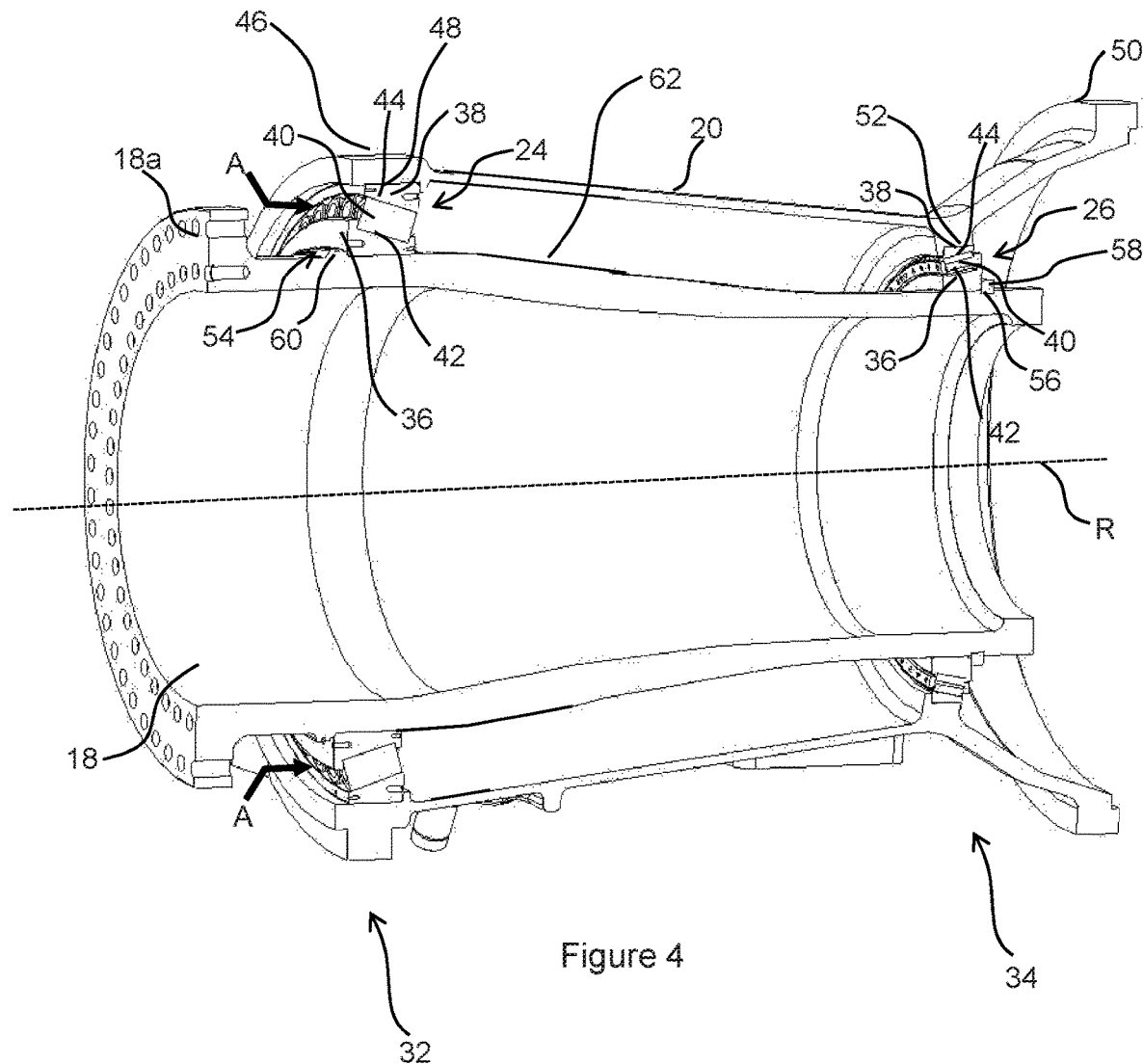
FIG. 4 is a cut-away view of the main shaft arrangement in FIG. 3.

In the case of a bearing set, as seen e.g. in FIG. 4, each of these may or may not include features as described herein for a single bearing.

The preferred lubrication medium according to embodiments of the present invention is oil.

Generally spoken oil lubrication is considered as advantageous vs. grease lubrication in the power train of wind turbines, as oil can be carried/sprayed directly into contact areas. Further it can be given a desired spray pattern, quantity and temperature. This also means that normally there are lower drag losses, as grease fillings typically amount up to 50% of the free space or even more. Furthermore, oil may be reconditioned in the oil lubrication circuit; reconditioning meaning cleaning up by filter systems and preheating or cooling down—if required. Finally, oil can easier be monitored regarding particle amounts and pollution and degradations. Thus, oil lubrication should be considered as preferable vs. grease with regard to serviceability: no refilling is necessary and no waste-oil needs to be disposed as it is the case for most grease lubricated applications.

Basically, the integrated lubrication method according to the present invention can be applied for different lubrication medium: oil spray- and oil mist injection lubrication or continuous or discontinuous grease lubrication. However, for the design of the present invention, the preferred lubrication medium shall be considered as oil, which is injected directly in between the outer ring raceway and the roller surface. Hereby the lubrication medium can be controlled much better with regard to injection quantity, temperature and intervals. Consequently, the bearing in focus may be lubricated even more efficient with oil than with grease, as drag losses are deduced and consequently the temperature level can be maintained on lever levels.

Figure 1:
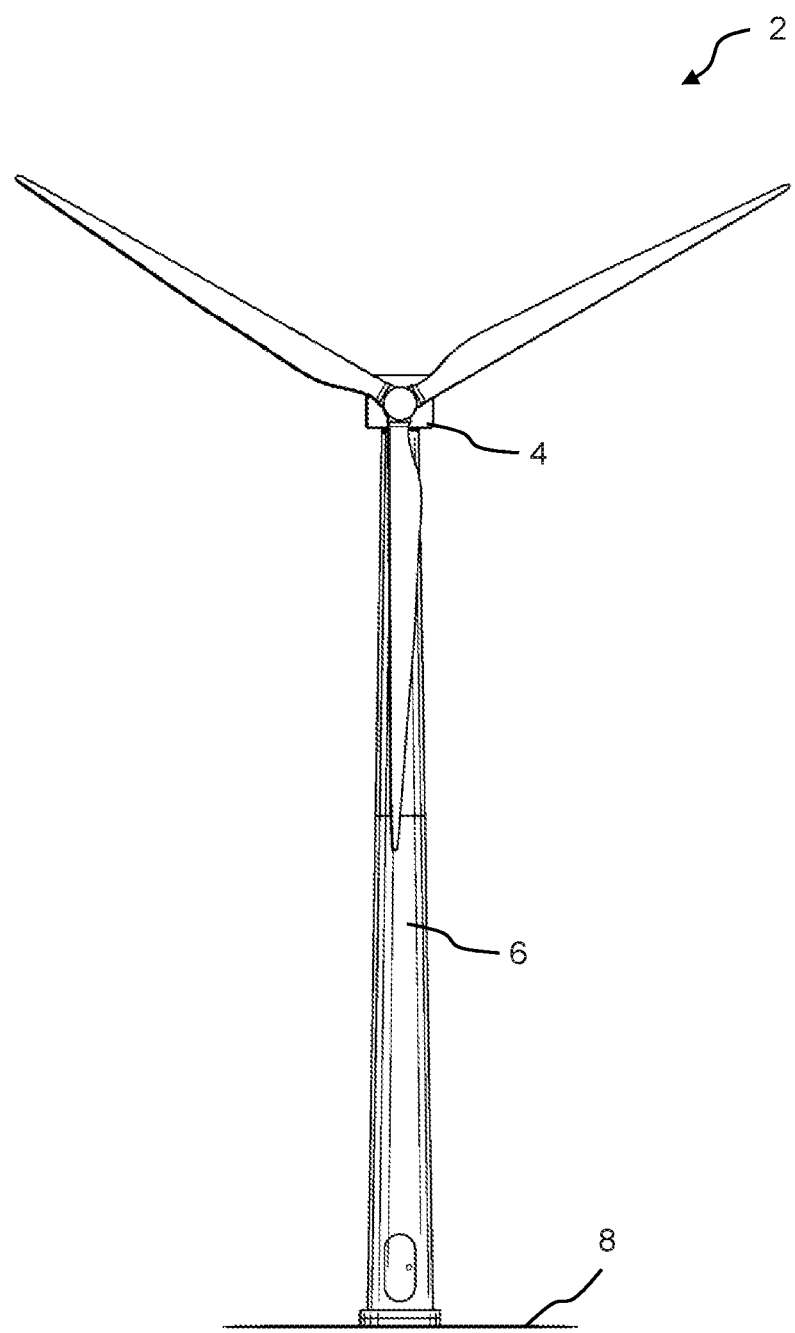
FIG. 1 is a front view of a wind turbine, comprising a main rotor arrangement according to the invention.
Figure 2:
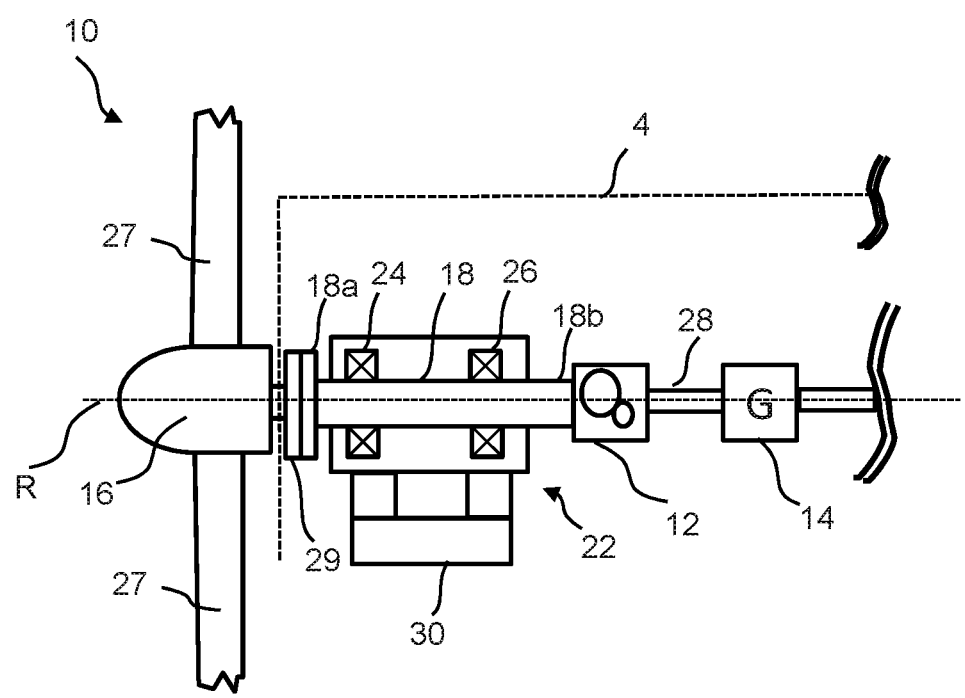
FIG. 2 is a schematic view of a drivetrain of the wind turbine of FIG. 1, including a main rotor arrangement.

With reference to FIG. 1, a wind turbine 2 includes a nacelle 4 that is supported on a generally vertical tower 6, which is itself mounted to a foundation 8. The foundation 8 may be on the land, or wholly or partially underwater. The nacelle 4 houses a number of functional components, some of which are shown schematically in FIG. 2, by way of example. Such a configuration would be well known to a skilled person.

Here, the nacelle 4 is shown as housing at least in part, the main rotor arrangement 10, a gearbox 12 and a generator 14. For brevity, some typical components have been omitted from FIG. 2 as they are not central to this discussion, for example a power converter and yaw drive. However, the presence of such components is implicit and such component would be well understood by the skilled reader.

The main rotor arrangement 10 includes a hub 16 coupled to a main rotor shaft 18, which is rotatably supported in a main shaft housing 20 by a main bearing arrangement 22. Note that the main shaft housing 20 is sometimes referred to in the art as a main bearing housing, and will be referred to as such from now on. In this embodiment, the bearing arrangement 22 comprises a forward bearing 24 and a rear bearing 26. The hub 16 is connected to a plurality of rotor blades 27, although three blades are typical in a HAWT. The blades 27 are acted on by the wind and therefore torque is applied by the hub 16 to the main rotor shaft 18 which causes it to rotate within a main bearing housing 20.

An input or 'forward' portion of the main rotor shaft 18 comprises a hub connection flange 18a, by which means the main rotor shaft 18 is connected to, and driven by, the hub 16. Here the flange 18a is shown as being connected to a further flange 29 that is associated with the hub 16, such that the two flanges form a coupling between the hub 16 and the main rotor shaft 18. The flange 18a can therefore be considered to be at the hub-connection end of the main rotor shaft 18.

An output portion 18b of the shaft 18 provides input drive to the gearbox 12. The gearbox 12 steps up the rotational speed of the main rotor shaft 18 via internal gears (not shown) and drives a high-speed gearbox output shaft 28. The high-speed output shaft 28 in turn drives the generator 14, which converts the rotation of the high-speed output shaft 28 into electricity. The electrical energy generated by the generator 14 may then be converted by other components (not shown here) as required before being supplied to the grid, for example, or indeed any electrical consumer. So-called "direct drive" wind turbines that do not use gearboxes are also known. The gearbox 12 may therefore be considered optional.

At this point it should be noted that although in this embodiment two support bearings 24, 26 are shown that provide support to the main rotor shaft 18 at forward and rearward positions, arrangements are also known in which the rearward bearing is omitted and, instead, rear support for the main rotor shaft 18 may be provided by the generator 14.

The main bearing housing 20 is supported on a base frame 30, which can also be known as a bed plate. Although not shown here, the base frame 30 may be coupled to a yaw drive at the upper part of the wind turbine tower 6 to enable the base frame 30 and, thus, the entire nacelle 4 to yaw with respect to the tower 6 so as to enable the direction of the hub 16 to be adjusted with respect to the wind direction.

The base frame 30 is typically a cast component, for example of iron/steel, and has the function to transfer the main shaft loads from the shaft 18, through the bearings 24, 26, the main bearing housing 20, and the base frame 30, and into the wind turbine tower 6.

Figure 3:
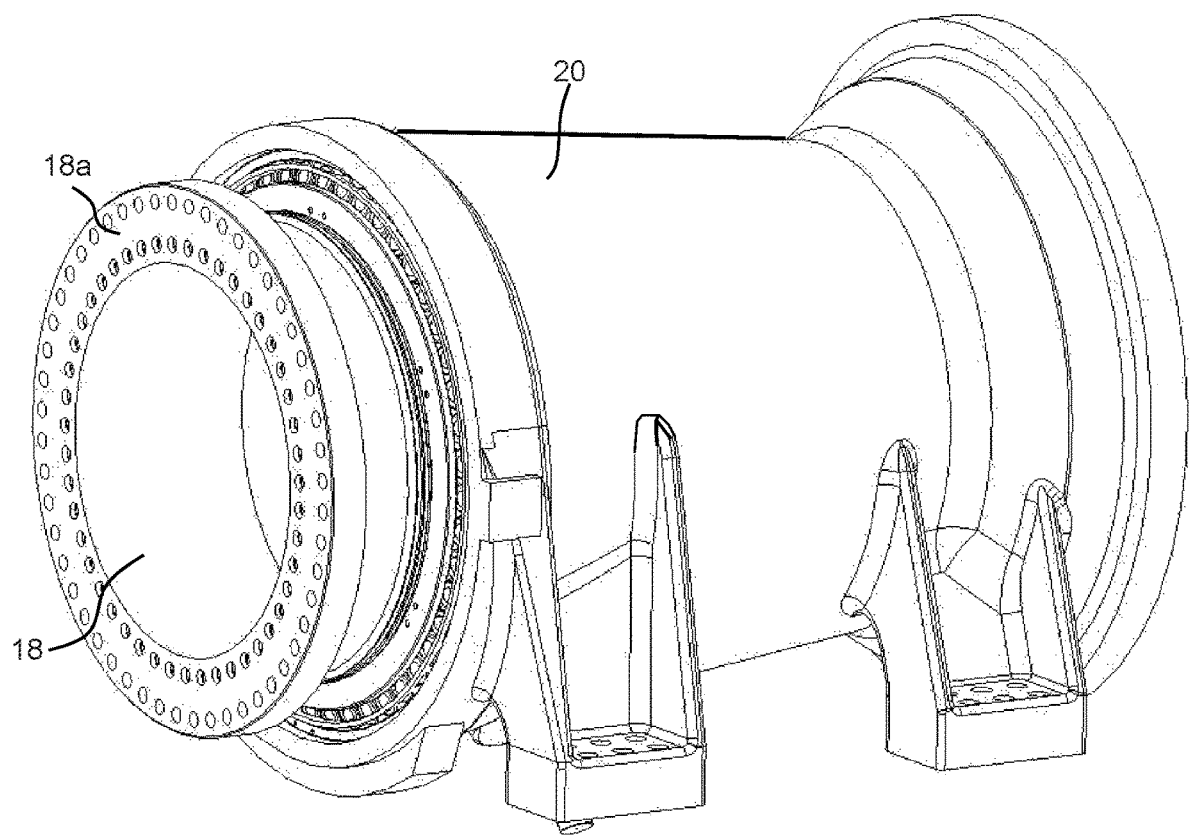
FIG. 3 is a perspective view of a main shaft arrangement having a set of single row main bearings.

FIGS. 3 and 4 illustrate a more practical realisation of a main bearing housing 20 and main rotor shaft 18 for a better understanding of the configuration of the relevant components.

It should be noted that whilst the general layout of the main bearing housing 20 and main rotor shaft 18 shown in FIGS. 3 and 4 is applicable to the present invention, the main inventive concept is not illustrated in these drawings (but will be described later with particular reference to FIGS. 5 to 8). However, FIGS. 3 and 4 provide useful context for the present invention.

Referring to FIGS. 3 and 4, the main rotor shaft 18 is tapered along its length to provide a relatively larger circumference at the forward end 32 of the shaft 18 and a relatively smaller circumference at the rearward end 34 of the shaft 18. It should be noted that it is not essential that the main rotor shaft 18 is tapered. However, this configuration may provide certain advantages as it allows the shaft 18 to support a larger forward bearing 24, capable of more effectively managing the substantial loads applied to it in use.

The forward and rear bearings 24, 26 are situated between the main rotor shaft 18 and main bearing housing 20, at forward and rearward positions respectively along the length of the shaft 18. The forward and rear bearings 24, 26 are therefore clamped or sandwiched between the shaft 18 and the main bearing housing 20, and enable the shaft 18 to freely rotate with respect to the housing 20 during wind turbine operation, about a rotor axis R that extends through the centre of the main rotor shaft 18.

The forward and rear bearings 24, 26 each include an inner ring 36, an outer ring 38 and a plurality of generally cylindrical rolling elements 40, more simply referred to as rollers, supported therebetween. Note that the inner ring may sometimes in the art be referred to as a cone, whereas the outer ring may sometimes be referred to as a cup. A typical wind turbine bearing for use in utility-scale applications, typically exceeding 1 MW in power output, must withstand high loads and operate reliably over an extended lifetime. In this embodiment, the forward and rear bearings 24, 26 are tapered roller bearings having tapered inner and outer races 42, 44 and tapered rolling elements 40 designed to accommodate combined axial and radial loads. In other embodiments, different types of bearings may be used, for example cylindrical roller bearings or spherical roller bearings (not shown). Cylindrical roller bearings utilise rows of cylindrical rolling elements that are in linear contact with races of the inner and outer rings. Spherical roller bearings include two rows of barrel-shaped rolling elements, which may be supported between a curved outer race and two inclined inner ring races.

The main bearing housing 20 comprises a front flared portion 46 that defines a forward bearing seat 48 and a rear flared portion 50 that defines a rear bearing seat 52. To secure the bearings 24, 26 in position, the main rotor shaft 18 includes a forward bearing retainer 54 or 'rib' for retaining the forward bearing 24 in the front bearing seat 48 and a rear bearing retainer groove 56 for holding a backing element such as a rear bearing clip 58, circlip, lock nut or similar structure that retains the rear bearing 26 in the rear bearing seat 52.

Focusing now on the forward bearing retainer 54, and with particular reference to FIG. 4, the forward bearing retainer 54 comprises a rib 60 in the form of a protrusion that extends radially outwards from an outer surface 62 of the main rotor shaft 18, and extends about the entire circumference of the main rotor shaft 18. This retaining rib 60 includes an abutment surface (not shown) facing away from the forward (hub) end 32 of the shaft 18, against which a corresponding abutment surface (not shown) of the inner ring 36 of the forward bearing 24 contacts in use.

In this way, the forward bearing 24 is located at the correct position along the length of the shaft 18, and is prevented from drifting towards the hub-end 32 of the shaft 18 during operation. As can be seen in FIG. 4, the forward bearing 24 is clamped between the main bearing housing 20 and the main shaft 18 so as to support the shaft and allow it to rotate freely with respect to the housing 20. Proper lubrication of the forward bearing 24 during use is crucial to ensure that the wear of the bearing remains at acceptable levels. Typically lubrication of the bearing would be achieved by a delivery system (not shown in detail in FIG. 4, but represented by arrows labelled 'A') which would deliver a lubrication medium to the exposed forward faces of the rollers. Such a delivery system may comprise a set of nozzles spaced about the circumference of the bearing and angled so as to deliver a pressurised jet of lubrication fluid towards the rollers at predetermined intervals. This ensures that lubrication fluid reaches the rolling surfaces of the rollers thereby maintaining thin film lubrication. One drawback of such a system, however, is that it requires significant installation space at the forward end of the shaft 18 and housing 20. Also, the delivery mechanism may result in splash-back of lubrication fluid out of the bearing and onto forward portions of the shaft, reducing the effectiveness of the lubrication.

Figure 5:
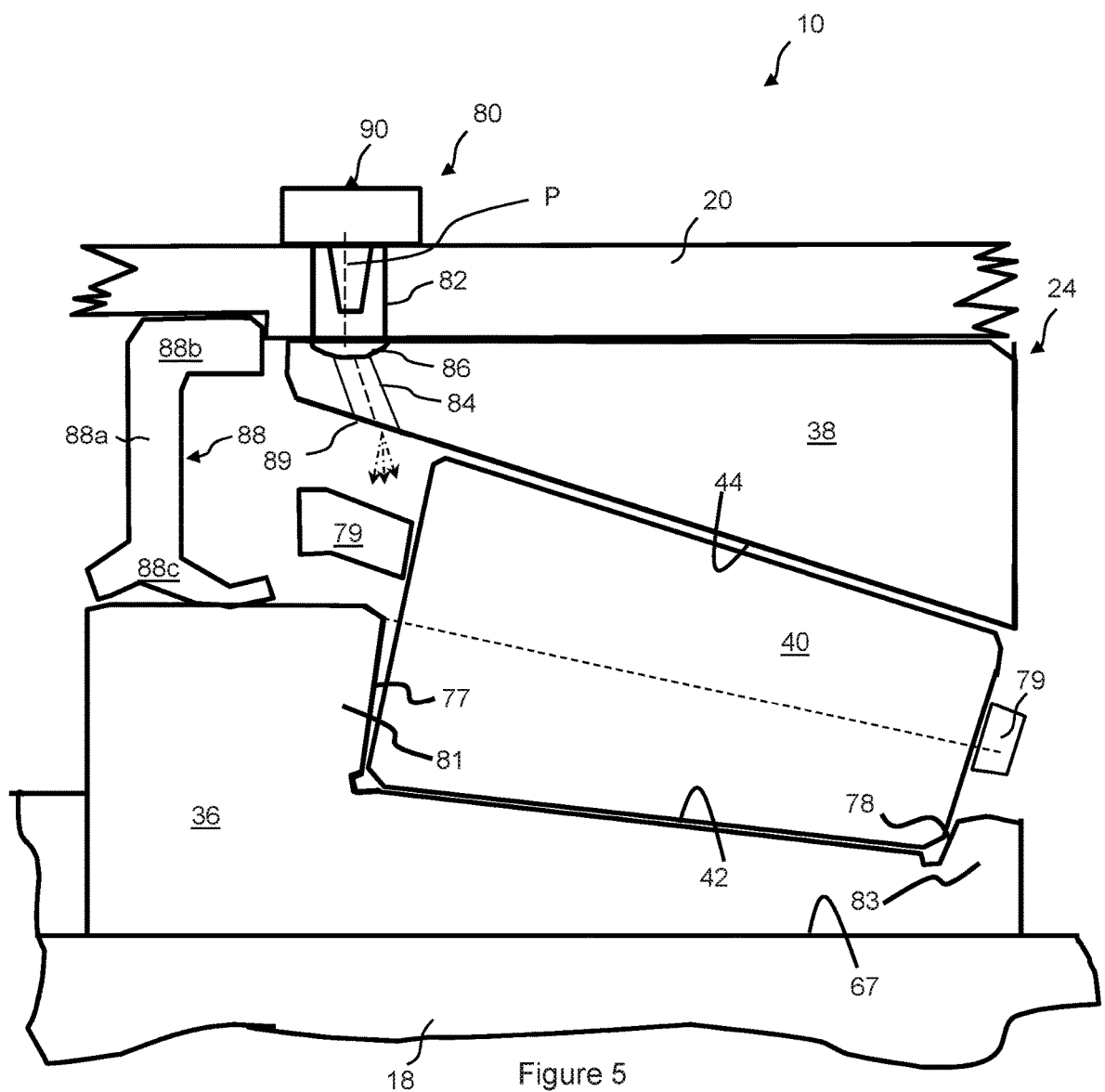
FIG. 5 is an enlarged view of a main shaft arrangement including a bearing in accordance with an embodiment of the invention.

FIG. 5 shows an enlarged view of a main rotor arrangement 10 in accordance with an embodiment of the present invention. Specifically, FIG. 5 shows a portion of the main rotor arrangement 10 in the region of the forward bearing 24. Note that the forward bearing 24 in FIG. 5 has a different configuration to that shown in FIG. 4, and so could be used instead in the main rotor arrangement 10. Like parts are denoted with like reference numerals for clarity.

As can be seen in FIG. 5, the inner ring 36 and the outer ring 38 are shaped to define inner and outer raceways or tracks 42,44, respectively along which the roller travels, and which are inclined to the shaft axis R. This is a typical set up but is not essential as other bearing arrangements could be used. Notably, the inner raceway 42 is defined by front and rear guiding flanges 77,78 provided by respective front and rear ribs 81,83, and these features that keep the rollers 40 in position on the raceway. Furthermore, a bearing cage or retainer 79 is provided that locates the rollers in respective pockets, as would be known in the art. The cage 79 may comprise a metallic structure, or other suitable material such as engineering polymer, that extends circumferentially around the rollers 40 and includes axial separators (not shown) that extend between neighbouring rollers 40, thereby ensuring that the rollers are spaced from one another and do not clash during operation.

Importantly, the main shaft arrangement 10 in FIG. 5 includes a lubricant delivery arrangement 80 which is configured to convey a lubrication medium through passages defined in the outer housing 20 and the bearing outer ring 38 so that the lubrication fluid is delivered very closely to the rollers 40. More specifically, the fluid delivery arrangement 80 includes a first lubrication passage 82 defined in the main shaft housing 20 and a second lubrication passage 84 defined in the outer ring 38. The lubrication passages 82,84, are in the form of bores or drillings through the metal material of the outer ring 38 and shaft housing 20.

In this embodiment, the first and second lubrication passages 82,84 are aligned so that lubricating fluid can flow from the first passage 82 to the second passage 84. Although only one of each passage may be provided, it is envisaged that a plurality of first and second lubrication passages could be provided in a circumferentially spaced arrangement about the outer ring 38 and the housing 20, respectively, in order to provide a greater degree of lubrication in a more distributed manner. To enable embodiments where the passages are not in precise alignment, the outer ring 38 may also define a collector channel 86. The collector channel 86 serves to collect lubrication fluid flowing from the first lubrication passage 82 and to guide that fluid in a circumferential direction about the outer ring 38. In this way, the collector channel 86 distributes lubrication fluid from one or more of the first lubrication passages 82 defined in the outer shaft housing 20 to the one or more second lubrication passages 84 defined in the outer ring 38 of the forward bearing 24. Note that in this embodiment the collector channel 86 is in the form of a shallow U-shaped groove that extends about a radially outer surface 38a of the outer ring 38. The second lubrication passage 84 penetrates the collector channel 86 so that fluid can flow into the passage 84 from the channel 86. A lower end 89 of the second lubrication passage 84 opens at a mouth on the inclined raceway of the outer ring 38 at a position that is very close to the roller. The second lubrication passage 84 is therefore configured to deliver lubrication fluid right where it is needed.

It should be noted that the second lubrication passage 84 can be configured to slope in a certain direction depending on the relative locations of the collector channel 86 and the roller 40. In the embodiment of FIG. 5, the second lubrication passage 84 has a slight left-right slope so that it points in the direction of the roller 40. Therefore, fluid that is discharged from the second lubrication passage 84 would contact the roller 40, and more particularly its front face, before being distributed to the rolling surfaces of the roller 40 where lubrication is required. In this embodiment, the slope angle is small, relative to vertical plane P, which can be considered to be normal to the axis of rotation of the shaft 18, and is in the region of 10 degrees. However, the precise angle and direction of slope can be selected to achieve certain objectives.

Lubrication fluid, preferably lubrication oil, may be delivered to the lubrication passages by any suitable means. In this embodiment, a lubrication nozzle 90 is located above the upper end of the first lubrication passage 82 so as to deliver fluid to it. Although not shown here, it should be appreciated that the lubrication nozzle 90 would be connected to a fluid circuit which would supply lubricating fluid from a central source or sump by a suitable pumping system, as would be known in the prior art.

In order to ensure that lubricating fluid is retained in the proximity of the rollers, a sealing element 88 may be provided. In this embodiment, the sealing element 88 is generally C-shaped in form and includes an upstanding main wall 88a capped by upper and lower flanges 88b,88c. The sealing element 88 may suitably be fixed to either the main bearing housing 20 or the bearing inner ring 36 so that rotation is permitted between the sealing element 88 and one of the housing or the bearing inner ring 36. The sealing element 88 therefore forms a snug fit between these components which ensures fluid is less likely to leak past it.

It should be appreciated from the above discussion that the lubricant delivery arrangement 80 provides a compact system for lubricating the bearing which does not require space-consuming delivery nozzles to be supported at the front end of the bearing 24. Since the lubrication passageways are defined internally to the main shaft housing 20 and the outer ring 38, the only external component that is required is the lubrication nozzle 90 to deliver fluid to the passages 82,84. In addition to the space-efficient arrangement, a major benefit is that lubricating fluid can be delivered in close proximity to the rollers 40 and, what is more, a sealing element can be positioned forward of the rollers since there are no delivery nozzles in that position.

Figure 6:
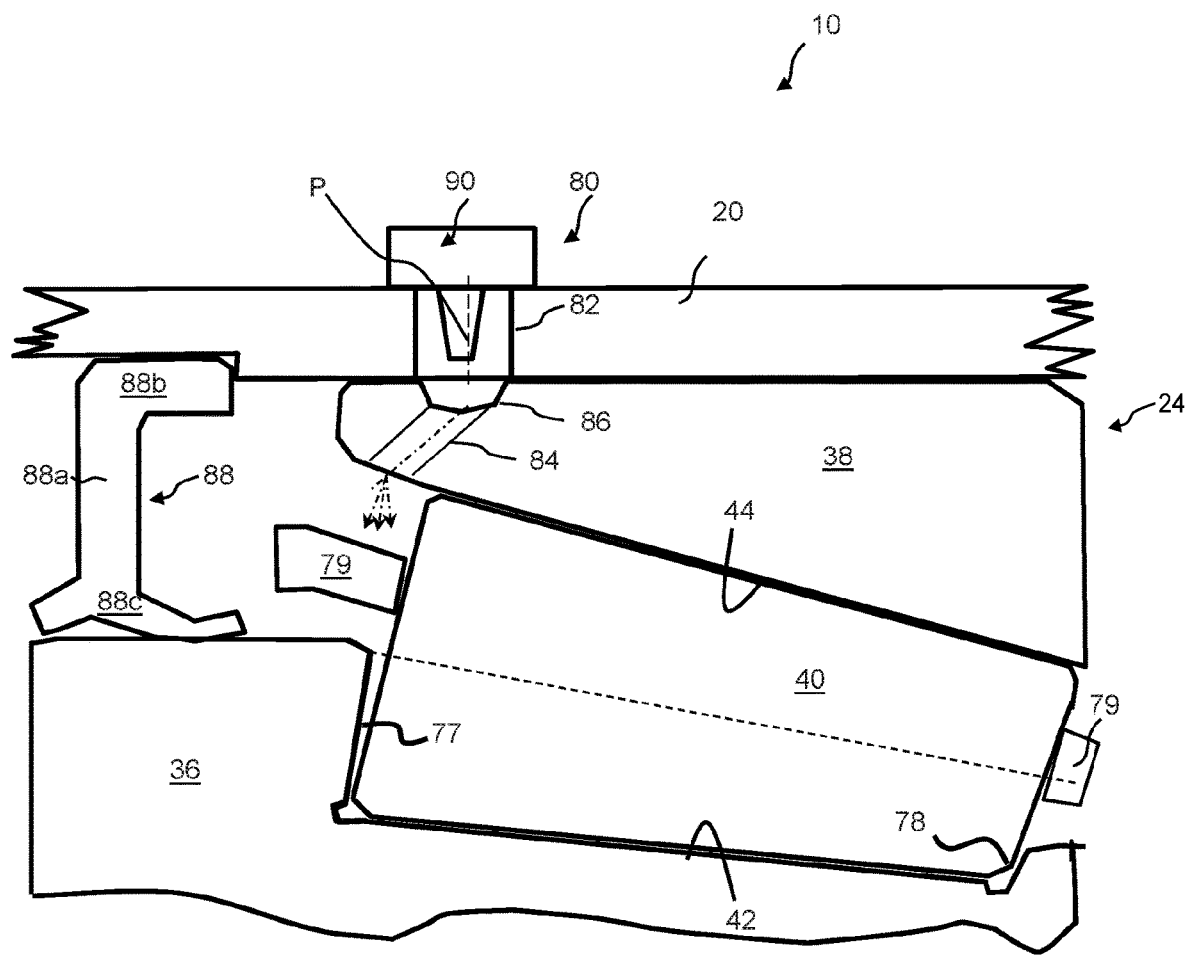
FIG. 6 is an enlarged view of a main shaft arrangement including a bearing in accordance with another embodiment of the invention.

FIG. 6 shows an alternative embodiment to that shown in FIG. 5, but demonstrates how the fluid lubrication passages 82,84 can be configured so as to adapt to differently sized outer bearing rings 38. Since FIGS. 5 and 6 are very similar, the same reference numbers will be used, and only the differences will be described here.

In the embodiment of FIG. 5, the second lubrication passage 84 was inclined slightly so that it slanted from left to right. This was necessary due to the position of the first lubrication passage 82 and the fact that the outer ring 38 was relatively long in the axial direction.

However, comparing the outer ring 38 in FIG. 6 to the outer ring 38 in FIG. 5, it will be noted that it is shorter in the axial direction. Therefore, in order to delivery lubricating fluid to the front face of the rollers 40, in this embodiment the second lubrication passage 84 is inclined so that it slants from the right to the left of the page. In other words, the passage extends downwardly and forwardly and, as illustrated defines an angle of approximately 45 degrees with respect to the vertical. Once again, the lower mouth of the passage 84 is located near to the front of the rollers 40 so that lubricating fluid is delivered to this point. Note that it would also be possible to configure the second lubrication passage 84 so that it extends through the outer ring 38 in a different direction; for instance it could extend in a vertical direction, that is to say perpendicular to the rotational axis of the shaft 18. Configuring the lubrication passage 84 so that the mouth opens at the end of the roller is beneficial since it allows lubrication to be delivered directly to the end of the roller which is a sensitive wear point, where the rollers meet the guide rib 77.

As a further example, the second lubrication passage 38 could be configured to extend through the outer ring 38 so that the mouth emerges at a point over which the rollers 40 travel. This has the advantage of providing lubrication fluid directly to the rolling surface of the rollers 40.

Figure 7:
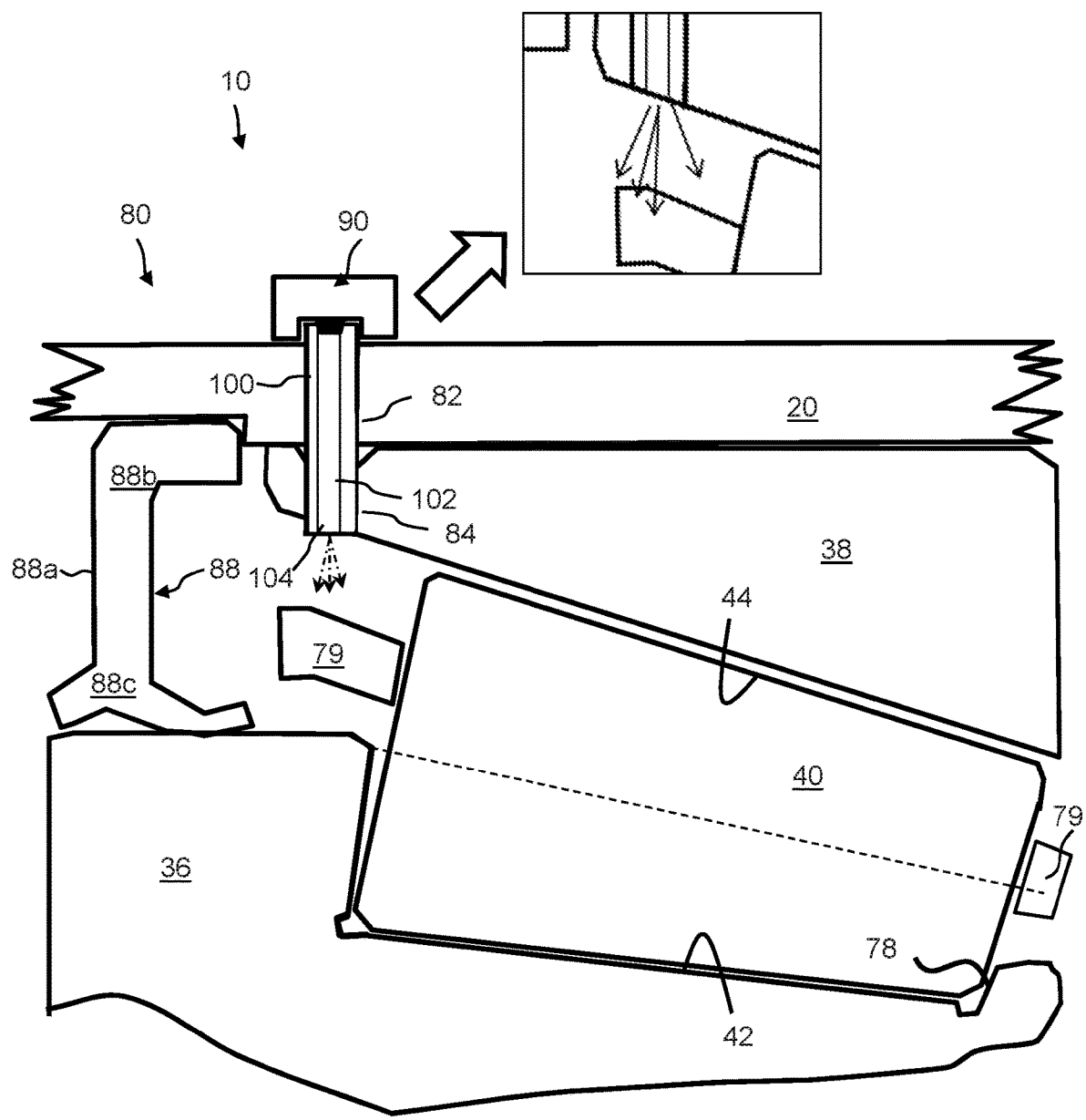
FIG. 7 is an enlarged view of a main shaft arrangement, like those in FIGS. 5 and 6, but including a bearing in accordance with another embodiment of the invention.

The discussion will now turn to a further embodiment which is shown in FIG. 7. The bearing arrangement retains the space-efficient packaging benefits of the previous embodiments, but also provides the facility to prevent the bearing 24 from "slipping" or "creeping" circumferentially during use. In a sense, therefore, two functions are integrated into the same packaging. In general, the enlarged view of the main shaft arrangement 10 FIG. 7 is the same as the embodiments described previously. So for brevity only the main distinctions and advantages will be described here.

As in the previous embodiments, the shaft arrangement includes a first lubrication passage 82 defined in the main shaft housing 20 and a second lubrication passage 84 defined in the outer ring 38 of the forward bearing 24. However, in this embodiment a locking element 100 extends downwards through the two lubrication passages 82,84.

Since the locking element 100 spans the first lubrication passage 82 and the second lubrication passage 84 it has the effect of restraining movement of the outer ring 38 with respect to the main shaft housing 20. The main function is the prevention of circumferential creep which may sometimes affect the outer ring 38. However, the locking element 100 will also restrain movement of the outer ring 38 along the axial direction.

The locking element 100 may take various forms. In one example, the locking element 100 may be in the form of a solid rod having a semi-cylindrical cross section. So, the locking element 100 would occupy only a portion of the volume of the lubrication passages 82,84, so that lubrication fluid would still be able to flow through them. Another example would be a solid rod having a cruciform cross section.

In the FIG. 7 embodiment, however, the locking element 100 takes the form of a hollow tube 102. The outer diameter of the tube 102 is substantially constant along its length, in this embodiment, and is selected so that the tube 102 fits tightly within the two lubrication passages 82,84. It will be appreciated that the two lubrication passages should be in substantial alignment in order for the tube 102 to be installed in them.

By virtue of this arrangement, lubrication fluid can therefore be delivered to the rollers 40 through the tube 102 rather than through the lubrication passages themselves. As such, the lubrication nozzle 90 is installed on the housing 20 so that it injects lubrication fluid into an upper end of the tube 102. It should be noted that the tube 102 may also be an integral component to the lubrication nozzle 90.

In the illustrated embodiment, an outer end or lower opening 104 of the tube 102 points straight downwards which would have the result of discharging fluid in the correct area near to the front face of the rollers 40. However, the tube 102 may also be shaped so that the mouth points towards the rollers 40. A narrowed opening in the form of the nozzle may also be provided, for example if a more directed jet of fluid is required or if it is desired to atomise the lubrication fluid.

Due to the shape of the tube 102 in FIG. 7, its lower end protrudes slightly from the second lubrication passage 84. In some circumstances, it might be preferable not to have any protrusions neat to the roller 40 and so it is envisaged that the lower end of the tube may be shaped so that it remains flush, or slightly sub-flush with the radially inward surface of the outer ring 38. Note that such an arrangement is shown in the inset panel in FIG. 7.

Note that although in this embodiment the outer diameter of the tube 102 is substantially constant, it is envisaged that this need not be the case and the diameter of the tube could vary, for example if the diameter of the lower lubrication passage 84 was different e.g. narrower, than the diameter of the upper lubrication passage 82. In this situation, therefore, the tube 102 would be required to have a stepped diameter.

Figure 8:
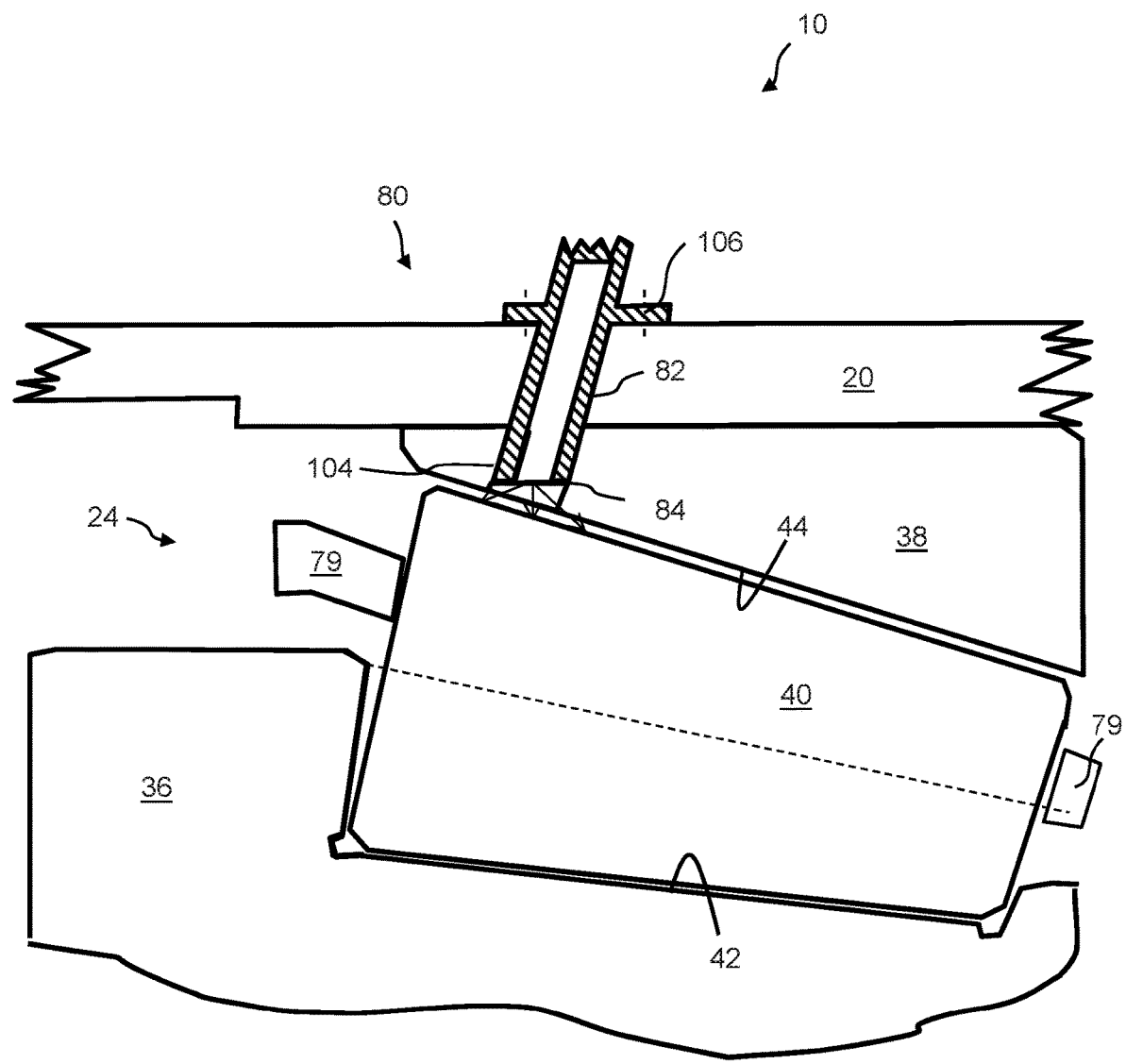
FIG. 8 is an enlarged view of a main shaft arrangement, like those in FIGS. 5 to 7, but including a bearing in accordance with a further embodiment of the invention

Turning now to FIG. 8, a final embodiment is shown which is very similar to previous embodiments. Therefore, the same reference numerals will be used for common features and only the significant differences will be described. By comparing the forwarding bearing arrangement 24 in FIG. 8 with the previous embodiments, it will be apparent that the axial length of the outer ring 38 is much shorter such that the most axially forward point of the outer ring 38 only reaches the front face of the roller 40. In this case, therefore, the first lubrication passage 82 and the second lubrication passage 84 are configured so that the lower end 89 (as shown in FIG. 5) of the second lubrication passage 84 opens at a region of the outer race 44 of the outer ring 38 over which the rollers 40 travels during use.

It will be appreciated that in such an installation, it is crucial that the lubrication tube 102 does not protrude beyond the lower end 89 of the passage 84. So, to guard against this, the lubrication tube includes a locating feature in the form of a positioning flange 106 towards its upper end. The location of the positioning flange 106 on the tube 102 is selected so that the length of the tube extending below the point of the flange 106 is not long enough to protrude out of the second lubrication channel—this is the configuration shown in FIG. 8.

It will be apparent to the skilled person that various modifications may be made to the specific embodiments described above without departing from the inventive concept, as defined by the claims.

In the above embodiments, the lubrication passages have been described as providing lubricating fluid either to the hub-end of the rollers 40, as in FIGS. 5-7, or to the middle of the raceway 44, as in FIG. 8. However, it should be noted that it is possible that multiple lubrication passages may be provided so that lubrication fluid can be delivered to different locations. For example, a network of passages may be machined into the outer ring 38 to provide fluid at the front end of the rollers, but also to one or more points along the raceway 44.

The invention claimed is:

1. A main rotor arrangement for a wind turbine, comprising:
    a shaft which is rotatable within a shaft housing about a rotational axis; and a bearing including an inner ring and an outer ring, and a plurality of rolling elements, wherein the bearing is located between the shaft and the housing thereby to enable the shaft to rotate within the shaft housing, wherein the shaft housing includes a first lubrication passage for carrying lubricating fluid through the shaft housing, wherein the outer ring of the bearing includes a second lubricating passage to direct lubricating fluid from the first lubricating passage in the direction of the plurality of rolling elements, wherein the first lubrication passage and the second lubrication passage are substantially in alignment, and wherein an elongate locking element extends through the first lubrication passage and the second lubrication passage.

2. The main rotor arrangement of claim 1, wherein the elongate locking element includes an outer end that extends beyond a raceway defined by the outer ring.

3. The main rotor arrangement of claim 1, wherein the elongate locking element includes an outer end that is truncated so as to lie flush with respect to a raceway defined by the outer ring.

4. The main rotor arrangement of claim 1, wherein the elongate locking element includes a locating feature which limits the extent to which the elongate locking element is able to extend through the first lubricating passage and the second lubricating passage.

5. The main rotor arrangement of claim 4, wherein the locating feature is a flange.

6. The main rotor arrangement of claim 1, wherein the elongate locking element is a lubrication tube for carrying lubrication fluid through the first and second lubricating passages.

7. The main rotor arrangement of claim 1, wherein the second lubricating passage defines a raceway opening at a position over which the plurality of rolling elements travel as the shaft rotates.

8. The main rotor arrangement of claim 1, wherein the lubricating fluid is lubricating oil.

9. The main rotor arrangement of claim 1, wherein said rolling elements are rollers.

10. The main rotor arrangement of claim 1, wherein said bearing comprises at least one single row rolling element bearing.

11. The main rotor arrangement of claim 1, wherein said bearing located between the shaft and the housing includes at least a forward bearing and a rear bearing.

12. The main rotor arrangement of claim 1, wherein the outer ring includes a circumferential collector channel along which lubricating fluid can flow from the first lubrication passage to the second lubrication passage.

13. The main rotor arrangement of claim 1, wherein the second lubrication passage extends through the outer ring at an inclined angle relative to a plane that is normal to the rotational axis of the shaft.

14. The main rotor arrangement of claim 1, wherein the second lubricating passage defines a raceway opening at a position beyond the rollers plurality of rolling elements.

15. A utility-scale wind turbine comprising a tower, a nacelle mounted to the tower, and a hub associated with the nacelle and connected to a plurality of wind turbine blades, wherein the hub is mounted to a main rotor arrangement as claimed in claim 1.

16. The main rotor arrangement of claim 1, further comprising:
a sealing element, wherein the sealing element is located between the housing and the inner ring,
wherein the sealing element is configured to retain lubricating fluid in the proximity of the rolling elements.

17. The main rotor arrangement of claim 16, wherein the sealing element is C-shaped and includes an upper flange connected to a lower flange by an upstanding main wall, wherein the upper flange contacts the housing and the lower flange contacts the inner ring.

18. The main rotor arrangement of claim 16, wherein the sealing element is fixed to the housing.

19. The main rotor arrangement of claim 16, wherein the sealing element is fixed to the inner ring.

* * * * *